United States Patent [19]

Jonasz

[11] Patent Number: 5,723,192
[45] Date of Patent: Mar. 3, 1998

[54] COMPOSITE COMPRESSION MOLDED ARTICLE, COMPOSITION THEREFOR AND PROCESS FOR MANUFACTURE THEREOF, AND USE

[75] Inventor: Slawomir Jonasz, Brossard, Canada

[73] Assignee: GNR Technologies Inc., Lasalle, Canada

[21] Appl. No.: 657,064

[22] Filed: May 29, 1996

[30] Foreign Application Priority Data

Jun. 7, 1995 [CA] Canada ................................. 2151183

[51] Int. Cl.$^6$ ........................................................ B32B 3/02
[52] U.S. Cl. ........................ 428/64.1; 277/227; 277/228; 277/235 B; 428/66.4; 428/66.6; 428/66.7
[58] Field of Search ............................. 428/64.1, 66.4, 428/66.6, 66.7; 277/227, 228, 235 B

[56] References Cited

U.S. PATENT DOCUMENTS

| 4,103,901 | 8/1978 | Ditcher | 277/9.5 |
| 5,240,346 | 8/1993 | Yin | 404/25 |
| 5,409,993 | 4/1995 | Kojima | 525/104 |

*Primary Examiner*—Nasser Ahmad
*Attorney, Agent, or Firm*—Swabey Ogilvy Renault

[57] ABSTRACT

A composite compression molded article is formed from a composition comprising: a) 60 to 97%, preferably 75 to 90%, by weight of rubber particles of a varied size distribution in the range of 5 to 30 mesh, b) 3 to 20%, preferably 5 to 12%, by weight, of a polymerizable material, said polymerizable material being non-reactive with said rubber particles, and polymerizing to form a matrix surrounding said rubber particles, and c) 0 to 20%, preferably 5 to 13%, by weight, of reinforcing fibres, said fibres being non-reactive with said polymerizable material; the article can particularly be formed as a gasket or adjustment unit which absorbs mechanical vibrations transmitted through a metal component thereby protecting an adjacent concrete component against fracture caused by such vibrations; other articles may also be produced including dock wedges, wheel chocks, speed bumps, delineator bases, anti-vibration pads, manhole and catch basin adjustment risers and portable temporary road or path surface members for use on construction sites to facilitate passage over, and protection of, ground cables and conduits on the site.

47 Claims, 1 Drawing Sheet

COMPOSITE COMPRESSION MOLDED ARTICLE, COMPOSITION THEREFOR AND PROCESS FOR MANUFACTURE THEREOF, AND USE

BACKGROUND OF THE INVENTION a) Field of the Invention

This invention relates to a compression moldable composition and a compression molded article formable therefrom and to a method of forming the molded article, and more especially a gasket or adjustment unit; the invention further relates to an assembly incorporating the gasket or adjustment unit; and to a method of inhibiting transmission of mechanical vibrations through a metal component to an adjacent concrete riser.

b) Description of the Prior Art

Waste rubber products, especially scrap vehicle tires and scrap rubber particles derived from re-treading of used vehicle tires, as well as scrap rubber particles formed in the manufacture of vehicle tires present a disposal problem. In particular disposal of such waste in landfill sites presents a serious fire hazard.

Recycling of such scrap rubber products presents difficulties, however, various proposals have been made to grind the scrap rubber products to particle form and employ the particles as filler in different products.

A separate problem arises with respect to maintenance holes for removal of rainwater, catch basins and valve chambers in which a concrete riser is in contact with a metal component which is exposed to vibration generating impacts, and the generated vibrations are transmitted through the metal component to the concrete riser. In such cases the vibrations cause fractures or cracking in the concrete riser, shortening its life such that it requires frequent replacement or repair.

SUMMARY OF THE INVENTION

It is an object of the invention to provide a compression moldable composition.

It is a further object of the invention to provide a compression molded article, for example, an adjustment unit or gasket adapted for insertion between a concrete riser exposed to mechanical vibrations and a metal component which transmits mechanical vibrations.

It is a still further object of the invention to provide in an assembly of a concrete riser and a metal component, the improvement of an adjustment unit or gasket disposed between the metal component and the concrete riser.

It is yet another object of the invention to provide a method of inhibiting transmission of mechanical vibrations through a metal component to a concrete riser adjacent to the metal component.

It is a still further object of the invention to provide a method of forming a molded article.

The present invention provides a novel use of waste rubber products and a solution to the aforementioned problem resulting from contact between a metal component and a concrete riser.

In particular the invention provides a moldable composition containing a major amount of such waste rubber products, in particle form, which composition can be compression molded to a molded article, more especially a gasket or adjustment unit for location between the metal component and the concrete riser.

Still further the invention provides molded articles for various purposes, which can be produced from compositions of the invention, with characteristics to meet particular requirements.

Thus broadly the invention contemplates a compression moldable composition comprising a) 60 to 97%, by weight, of rubber particles of a varied size distribution in the range of 5 to 30 mesh, b) 3 to 20%, by weight, of a polymerizable material, said polymerizable material being non-reactive with the rubber particles, and polymerizing to form a matrix surrounding the rubber particles, and c) 0 to 20%, by weight, of reinforcing fibres, the fibres being non-reactive with the polymerizable material.

In accordance with one aspect of the invention there is provided a compression moldable composition comprising: a) 75 to 90%, by weight, of rubber particles of a varied size distribution in the range of 5 to 30 mesh, b) 5 to 12%, by weight, of a polymerizable material, the polymerizable material being non-reactive with the rubber particles, and polymerizing to form a matrix surrounding the rubber particles, and c) 5 to 13%, by weight, of reinforcing fibres, the fibres being non-reactive with the polymerizable material.

In accordance with another aspect of the invention there is provided a compression molded article formed from an afore-mentioned composition of the invention in which the rubber particles and reinforcing fibres are distributed throughout, and surrounded by, a polymer matrix formed from polymerization of the polymerizable material.

In still another aspect of the invention there is provided a compression molded article comprising rubber particles and reinforcing fibres in a polymer matrix and having a maximum Durometer Hardness variance of 20 Shore A, a tensile strength of at least 1 MPa, a Compression Deformation of 2 to 10% and a maximum compression set of 4%.

In a particular embodiment the molded article is an adjustment unit or gasket.

In another aspect of the invention there is provided in an assembly of a concrete riser and a metal component in which said metal component is exposed to vibration generating impacts, the vibrations being transmissible through said metal component to said concrete riser, the improvement wherein an adjustment unit or gasket is disposed between the metal component and the concrete riser to absorb mechanical vibrations transmitted through the metal component and inhibit transmission of the vibrations to the concrete riser, the annular adjustment unit or gasket being a molded article of the invention as described hereinbefore.

In still another aspect of the invention there is provided a method of inhibiting transmission of mechanical vibrations through a metal component to a concrete riser adjacent to the metal component, comprising disposing an adjustment unit or gasket between the metal component and the concrete riser, the adjustment unit absorbing mechanical vibrations transmitted through the metal component thereby inhibiting transmission of the vibrations to the concrete riser, the annular adjustment unit being a molded article of the invention as described hereinbefore.

In yet another aspect of the invention there is provided a method of forming a molded article comprising i) mixing rubber particles and optionally reinforcing fibres to form a matrix, the rubber particles being of a varied size distribution in the range of 5 to 30 mesh, ii) adding a polymerizable liquid material to the mixture from i) and blending the mixture with the liquid material to form a blend of the rubber particles, the fibres and the liquid material in which the particles and the fibres are coated with the liquid, iii) compression molding the blend in a mold, while polymerizing the liquid material, at an elevated temperature and pressure, and iv) recovering a molded article having a polymer matrix derived from the polymerizing of the liquid material, from the mold, and wherein the rubber particles in step i) are present in an amount to provide 60 to 97%, preferably 75 to 90%, by weight, of the rubber particles in the molded article, the fibers in step i) are present in an amount to provide 0 to 20%, preferably 5 to 12%, by weight of the fibres in the molded article and the liquid material in step ii) is present in an amount such that the polymer matrix comprises 3 to 20%, preferably 5 to 12%, by weight, based on the weight of the molded article.

In the above formulations the % by weight is to a total of 100%.

DETAILED DESCRIPTION OF INVENTION a) MOLDABLE COMPOSITION i) Rubber Particles

The rubber particles in the compositions of the invention are rubber particles of a varied size distribution in the range of 5 to 30 mesh.

The rubber particles may comprise elongate particles or rubber crumb or may comprise a mixture of elongate particles and rubber crumb. The elongate particles are especially preferred.

The elongate rubber particles more especially have a length significantly greater than their width or thickness, for example, a length:thickness ratio of 4 to 8:1.

Especially suitable elongate rubber particles are buffings formed during the shredding of the surface of a vehicle tire during re-treading. These buffings are elongate or string-like and enhance the strength and flexibility of the molded article as compared with rubber crumb which comprises somewhat spherical or spheroidal particles. In the molded article the buffings interlock enhancing the strength and flexibility of the article.

Buffings of 5 mesh typically have a length of about 0.5 inches and a thickness of 0.0625 to 0.125 inches.

It is important that the rubber particles be of varying size distribution. This avoids the formation of voids in the molded article, which weaken the structure and provide fracture generating sites, especially if water enters the voids during use of the molded article.

When rubber particles of varying size distribution are employed, the fine and finer particles occupy the spaces between the larger or coarser particles.

It is found to be especially appropriate to employ a size distribution of the rubber particles in which a major amount of the particles are of 10 mesh, and lesser amounts are of 5 mesh and 20 to 30 mesh, respectively.

An especially useful size distribution comprises about 50%, by weight, of particles passing a 10 mesh screen, about 25%, by weight, of particles passing a 5 mesh screen and about 25%, by weight, of particles passing a 20 to 30 mesh screen.

The waste rubber particles of the invention are, in particular, particles of cured or vulcanized waste rubber products; such rubber may be natural rubber or synthetic rubber, for example, polyisoprene rubbers, polybutadiene rubbers, butyl rubbers, ethylene-propylene-diene rubbers and mixtures thereof.

As indicated above rubber particles derived from waste vehicle tires or from re-treading of used vehicle tires are especially useful.

The rubber particles should be non-reactive with the polymerizable material so that the integrity of the particles is maintained in the molded composition.

ii) Polymerizable Material

The polymerizable material is, more especially, a liquid which will coat the rubber particles and the reinforcing fibres of the composition, and which will polymerize during compression molding of the composition to form a polymer matrix.

As polymerizable material there is especially preferred polyurethane prepolymers which polymerize to a polyurethane matrix, especially suitable prepolymers include methylene-4,4'-di(phenyl-isocyanate) and polymers or oligomers thereof having an NCO functionality of from 2.2 to 3, and 4,4',4"-triphenylmethane triisocyanate.

In some cases it is appropriate to employ a polymerization initiator depending on the chemical nature of the polymerizable material.

When the polymerizable material is a polyurethane prepolymer as described hereinbefore the cure or polymerization of the prepolymer is suitably carried out with water or a polyol as initiator.

A polymerization catalyst may also be employed to promote the cure. In the case of polyurethane prepolymers, suitable catalysts include amine catalysts and organometallic catalysts, for example, dibutyltin dilaurate, dibutyltin acetate, dibutyltin dithiocarboxylate and dibutyltin oxide.

iii) Reinforcing Fibres

The reinforcing fibres increase the strength of the molded composition, but also increase the rigidity, consequently the content of fibres needs to be controlled so as to obtain the strength without sacrificing the flexibility.

In the case of molded articles in which strength is not an essential requirement, the fibres may be omitted or only a relatively small amount of below 5%, by weight, may be employed to achieve a desired strength parameter. In other cases where high strength is desired and rigidity or lack of flexibility is not a concern, a relatively high amount of fibres above 12%, by weight, may be employed.

The fibres should be non-reactive with the polymerizable material, so that their integrity is maintained in the molded composition.

Suitable fibres include synthetic plastic or polymer fibres, an especially useful class of fibres is polyamide fibres such as those referred to generally as nylon fibres. In particular the invention utilizes with advantage, clumps of nylon fibre matting, which clumps are generally flat and of irregular shape but with maximum dimensions of the order of 0.5 inches, and composed of interlocking nylon fibres.

These clumps are particularly derived from manufacture of nylon matting which is employed as reinforcing layers between adjacent rubber layers of rubber conveyor belts.

iv) Proportions

The relative proportions of the moldable composition are not subject to wide variation if the desired physical characteristics in the molded composite article are to be achieved.

The rubber particles are employed in an amount of 60 to 97%, preferably 75% to 90%, more preferably 80 to 85% and most preferably about 80%, by weight, of the composition.

The polymerizable material is employed in an amount of 3 to 20%, preferably 5 to 12%, more preferably 7 to 9%, and most preferably about 8%, by weight, of the composition.

The reinforcing fibres are employed in an amount of 0 to 20%, preferably 5 to 13%, more preferably 7 to 12%, and most preferably about 12%, by weight, based on the weight of the composition.

The afore-mentioned % amounts are to a total of 100%.

Water is the preferred polymerization initiator for polyurethane prepolymers and is suitably employed in an amount of 0.1 to 2%, by weight, of the composition.

The catalyst is suitably employed in an amount of 0.05 to 2%, by weight based on the weight of prepolymer.

b) MOLDED ARTICLE

The composition of the invention can be compression molded to a composite molded article in which the rubber particles and the reinforcing fibres are embedded in a polymer matrix derived from the polymerizable material. In the preferred embodiment in which the rubber particles are elongate, they are randomly oriented in the composite; likewise the reinforcing fibres, if present, are randomly oriented in the composite.

The molded article may in particular be in the form of a relatively thick sheet or panel having superior vibration damping characteristics.

Typical molded articles of the invention include gaskets or adjustment units, dock wedges, wheel chocks, speed bumps, delineator bases, antivibration pads, manhole and catch basin adjustment risers and portable temporary road or path surface members for use on construction sites to facilitate passage over, and protection of, ground cables and conduits on the site.

In one especially important embodiment the article is a gasket or adjustment unit for insertion between conduit components of a flow passage to prevent or inhibit transmission of vibration developed in a metal component to a non-metal component which may be damaged by the vibration, for example, a concrete component.

The gasket or adjustment unit has generally flat upper and lower opposed major surfaces and a peripheral outer side edge spaced from a peripheral inner side edge; the peripheral inner side edge defines an orifice in the gasket or adjustment unit. The gasket or adjustment unit may, in particular, be an annular disc, of circular or generally circular outline; or it may be of rectangular outline; thus the gasket or adjustment unit may have a circular or rectangular orifice therethrough.

The upper and lower surfaces may be parallel or generally parallel, or one of the surfaces may be inclined relative to the other so that the adjustment unit or gasket tapers in wedge-like manner throughout its width. The tapered adjustment units or gaskets are employed in maintenance holes located in a sloping part of a road.

In particular the composite, molded, gasket or adjustment unit may be inserted between a concrete riser and a metal component, for example, a metal component of a manhole cover, catch basin or valve chamber, which together define part of a flow passage for water or aqueous liquids or sludges. In such structures the metal component is frequently exposed to impacts which generate mechanical vibrations which are transmitted through the metal component to the concrete riser. This occurs, for example, in maintenance holes in the road where the manhole cover is subjected to impacts from vehicles travelling along the road.

The transmitted mechanical vibrations ultimately cause fractures and cracking of the concrete, typically after 12 months use, necessitating replacement or repair of the concrete riser.

In particular the composition of the invention can form a molded gasket or adjustment unit which absorbs the mechanical vibrations transmitted by such metal component and prevents or inhibits the transmission of the vibrations to the concrete riser, thereby preventing damage to the riser and extending the useful life of the riser while avoiding the need for repair.

In particular, the annular adjustment unit can be formed with the following characteristics:

maximum Durometer Hardness variance of 20 Shore A, preferably a maximum of 15 Shore A;

tensile strength of at least 1 MPa;

Compression Deformation of 2 to 10%, preferably 3 to 9%, and more preferably 6%±2%; and maximum Compression Set at 4%.

With these characteristics the annular adjustment unit significantly extends the useful life of the adjacent concrete riser.

c) COMPRESSION MOLDING PROCESS

The composite molded article is produced by compression molding the composition of the invention in a state in which the rubber particles, which are preferably elongate rubber particles, and the fibres, if present, are intermingled and coated with the polymerizable material which is to form the polymer matrix of the composite.

In the process of the invention measured amounts of the rubber particles and reinforcing fibres are thoroughly mixed together, for example, in a paddle mixer or ribbon blender, at a speed typically of 30 to 50 rpm.

The polymerizable material, for example, liquid polyurethane prepolymer is added to the mixture and mixing is continued for about 5 to 15 minutes to form a blend in which the rubber particles and the fibres are coated with the liquid prepolymer.

The polymerization initiator, for example, water is added while continuing the mixing to disperse the initiator throughout the blend and the resulting blend is transferred to a mold and subjected to compression molding at elevated temperature, typically of 150° F. to 170° F., preferably about 160° F., and elevated pressure typically 300 to 1000 psi.

On addition of the polymerization initiator, polymerization commences, consequently the mixing to disperse the initiator and the transfer of the mold must be completed within a few minutes.

The compression molded article is removed from the mold, whereafter it may be subjected to trimming or polishing to smoothen the outer molded surfaces and remove any rough edges.

BRIEF DESCRIPTION OF DRAWINGS

The invention is illustrated in particular and preferred embodiments by reference to the accompanying drawings in which.

DESCRIPTION OF PREFERRED EMBODIMENTS WITH REFERENCE TO THE DRAWINGS

Figure 1:
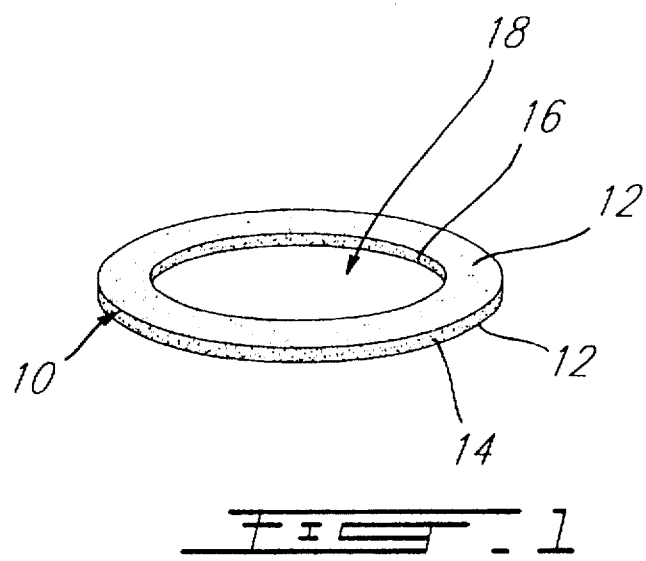
FIG. 1 is a perspective view of an annular adjustment unit of the invention.

With further reference to FIG. 1, an annular adjustment unit 10 has opposed, substantially flat surfaces 12, an outer annular wall 14 and an inner annular wall 16 defining an orifice 18.

Figure 2:
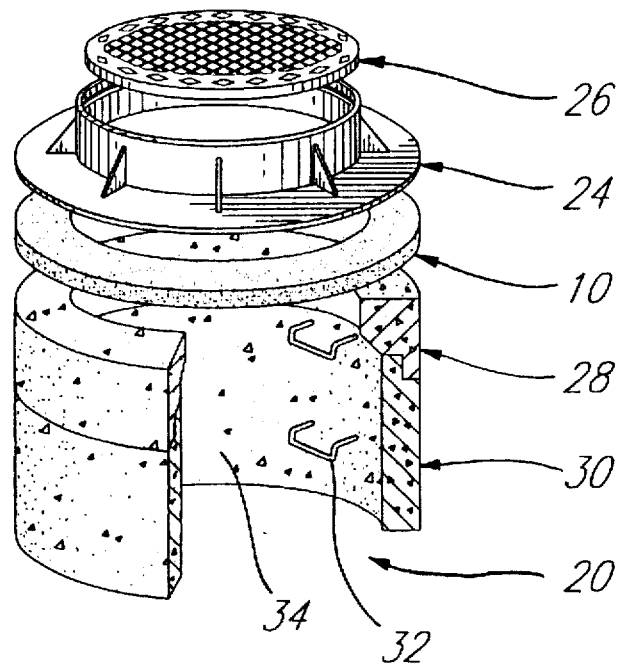
FIG. 2 is a cross-sectional elevation of a maintenance hole incorporating the adjustment unit of FIG. 1.

With further reference to FIG. 2, there is shown an exploded view of a maintenance hole 20 which typically will be in a road (not shown).

Maintenance hole 20 has a metal manhole frame 24, having a metal cover 26 and concrete risers 28 and 30. Steps 32 are located on the inner wall 34 of riser 30.

An annular adjustment unit 10 of FIG. 1 is disposed between metal manhole frame 24 and concrete riser 28.

In use vehicles travelling on the road in which the maintenance hole 20 is located impact metal cover 26 and the upper rim of metal frame 24 and develop mechanical vibrations which are transmitted through metal frame 24 towards concrete riser 28.

The mechanical vibrations are absorbed by the adjustment unit 10 and the transmission of vibrations to riser 28 is prevented or inhibited, thereby preventing damage to riser 28.

EXAMPLES

Example 1

Into a paddle mixer, rotating at 40 rpm, there was introduced:

56 lbs of rubber buffings from the retreading of vehicle tires, 8.4 lbs of reinforcing fibres, and the buffings and fibres were mixed for 1 to 2 minutes.

The rubber buffings comprised 50%, by weight, passing a 10 mesh screen, 25%, by weight, passing a 5 mesh screen and 25%, by weight, passing a 20–30 mesh screen.

The reinforcing fibres were clumps of nylon fibre matting being a waste product from nylon fibre matting employed as a reinforcement layer in rubber conveyor belts; the clumps were of irregular shape and generally flat and composed of interlocking fibres, the clumps had a maximum dimension in two perpendicular directions of about 0.5 inches.

To the resulting mixture of buffings and clumps in the paddle mixer was added 5.6 lbs of a polyurethane prepolymer, methylene-4,4'-di(phenylisocyanate), while continuing the mixing action of the paddle mixer to coat the buffings and fibres of the clumps with the prepolymer and mixing was continued for a further 15 minutes. 1 lb of water were added to the mixer while continuing the mixing and mixing was continued for 1 to 2 minutes.

The resulting blend was transferred to a compression mold shaped to provide a unit 10 as illustrated in FIG. 1, and the blend was compression molded at a temperature of 160° F. and a pressure of 350 psi for 20 minutes.

The unit 10 was removed from the mold and trimmed to remove rough edges and provide smooth surfaces 12, 14 and 16.

The resulting unit 10 had an external diameter of 1041 mm, an internal diameter of 717 mm, and a thickness of 63 mm.

The unit 10 was subjected to testing after passage of 24 hours, and for the testing was maintained at 23°±2° C. for at least 12 hours prior to and during the test.

i) Hardness

The molded surface hardness was measured across the surfaces 12, as well as the interior hardness was measured with a Durometer in accordance with ASTM D2240, Type A, the readings being taken within 1 second after the presser foot was in firm contact with the unit 10.

In the case of the molded surface hardness a minimum of 6 measurements was taken on each molded surface, with each measurement being at different positions evenly spaced along the surfaces and at least 12 mm from any edge of unit 10. The test revealed a variation in surface hardness of only 15 Shore A.

In the case of the interior hardness, the unit 10 was cut into 3 equal size specimens producing 6 cut surfaces and interior hardness measurements were taken along the vertical and horizontal axes of each cut surface with 4 evenly spaced measurements along each axis. Each measurement being at least 6 mm apart and at least 12 mm from any edge of the specimen.

The test revealed a variation in surface hardness at the cut surface of only 15 Shore A.

ii) Tensile Strength

Three test specimens were cut from unit 10 as for the internal hardness test. The tensile strength of each straight specimen was tested by ASTM D 412 Section 1412 and revealed tensile strengths of −1.7 MPa, 1.6 MPa and 1.7 MPa for the three specimens.

iii) Compression Deformation and Compression Set

Three test specimens were cut from unit 10 as described previously. Each test specimen was subjected to compression deformation and compression set testing.

Each specimen has a thickness of 25 mm and top and bottom surface areas of 91.2 cm$^2$, which top and bottom surfaces were not larger than the plates of the compression equipment.

Each specimen was tested for initial compression deformation, final compression deformation and compression set.

Initial Compression Deformation

The initial compression deformation for each specimen was tested in the following manner:

1. The dimensions of each specimen were recorded to the nearest 0.02 mm prior to being subjected to any testing.
2. The specimens were placed in the compression equipment using extreme care to place it exactly in the centre between the plates to avoid tilting. An initial constant load was applied to achieve 0.05 MPa stress on the specimen. Immediately the thickness of the specimen was determined by measuring the distance between the top and bottom plates. This value represents the initial thickness of the specimen prior to compression.
3. Over a period of 30 seconds or less, a constant load was applied and maintained to achieve a 1 MPa stress in the specimen.
4. Immediately after the required load had been achieved the initial compression deformation thickness of the specimen was determined by measuring the distance between the top and bottom plates and calculating the percentage of compression as follows:

$$C_{11}=[(D_1-D_2)/D_1]\times100.$$

where:

$C_{11}$=initial compression deformation as a percentage of the initial thickness, $D_1$=initial thickness, and $D_2$=initial compression deformation thickness.

The specimens had compression deformation of 5.3%, 4.6% and 5.1%.

Final Compression Deformation

The final compression deformation for each specimen was tested in the following manner:

1. A constant load was maintained for a period of 30 minutes.
2. At the end of the 30 minute period, the final compression deformation thickness of the specimen was determined by measuring the distance between the top and bottom plates and calculating the percentage of compression as follows:

$$C_{12}=[(D_1-D_2)/D_1]\times100.$$

where:

$C_{12}$=final compression deformation as a percentage of the initial thickness, $D_1$=initial thickness, and $D_2$=final compression deformation thickness.

The specimens had final compression deformation of 6.1%, 5.3% and 6%.

Compression Set

The maximum compression set for each specimen was tested in the following manner:
1. The load on the specimen was removed and the specimen allowed to rest undisturbed for a period of 30 minutes.
2. At the end of the 30 minute period, a constant load was applied to achieve 0.05 MPa stress to the specimen. Immediately the compression set thickness of the specimen was determined by measuring the distance between the top and bottom plates and calculating the percentage of compression set as follows:

$$C_2 = [(D_1 - D_4)/D_1] \times 100.$$

where:

$C_2$ = compression set as a percentage of the initial thickness, $D_1$ = initial thickness, and $D_4$ = compression set thickness.

The specimens had compression set of 0.1%, 0.3% and 0.9%.

I claim:

1. A compression molded article in the form of an adjustment unit or gasket adapted for insertion between a concrete riser exposed to mechanical vibrations and a metal component which transmits mechanical vibrations, comprising in weight %, 75 to 90% of rubber particles of varied size distribution in the range of 5 to 30 mesh, 5 to 12% of a polymer matrix, and 5 to 13% of reinforcing fibres, said rubber particles and reinforcing fibres being distributed throughout, and surrounded by, said matrix, wherein said rubber particles are selected from rubber crumb, buffings from vehicle tires and mixtures thereof.

2. A compression molded article in the form of an adjustment unit or gasket adapted for insertion between a concrete riser exposed to mechanical vibrations and a metal component which transmits mechanical vibrations, comprising in weight %, 75 to 90% of rubber particles of varied size distribution in the range of 5 to 30 mesh, 5 to 12% of a polymer matrix, and 5 to 13% of reinforcing fibres, said rubber particles and reinforcing fibres being distributed throughout, and surrounded by, said matrix, wherein said rubber particles are buffings from vehicle tires, said buffings having a length significantly greater than width, and wherein interlocking occurs between adjacent buffings in the matrix.

3. An article according to claim 2, wherein said size distribution is about 50%, by weight, of 10 mesh, about 25%, by weight, of 5 mesh and about 25%, by weight, of 20 to 30 mesh.

4. An article according to claim 1, comprising, in weight %, about 80% of said rubber particles, about 8% of said polymer matrix and about 12% of said reinforcing fibres.

5. A compression molded article in the form of an adjustment unit or gasket adapted for insertion between a concrete riser exposed to mechanical vibrations and a metal component which transmits mechanical vibrations, comprising in weight %, 75 to 90% of rubber particles of varied size distribution in the range of 5 to 30 mesh, 5 to 12% of a polymer matrix, and 5 to 13% of reinforcing fibres, said rubber particles and reinforcing fibres being distributed throughout, and surrounded by, said matrix, wherein said reinforcing fibres comprise clumps of fibre matting in which fibres of the clumps are interlocked.

6. An article according to claim 5, wherein said fibre matting is nylon fibre matting.

7. An article according to claim 5, in which said polymer is a polyurethane.

8. An adjustment unit or gasket of claim 1, having a maximum Durometer Hardness variance of 20 Shore A, a tensile strength of at least 1 MPa, a Compression Deformation of 2 to 10% and a maximum Compression Set of 4%.

9. An adjustment unit or gasket of claim 1, having a maximum Durometer Hardness variance of 14 Shore A, a tensile strength of at least 1 MPa, a Compression Deformation of 6%±2% and a maximum Compression Set of 4%.

10. In an assembly of a concrete riser and a metal component in which said metal component is exposed to vibration generating impacts, the vibrations being transmissible through said metal component to said concrete riser, the improvement wherein an adjustment unit or gasket is disposed between said metal component and said concrete riser to absorb mechanical vibrations transmitted through said metal component and inhibit transmission of the vibrations to the concrete riser, said adjustment unit or gasket being as defined in claim 1.

11. An assembly of claim 10, wherein said metal component is a manhole unit.

12. A compression molded article in the form of an adjustment unit or gasket having generally flat upper and lower major surfaces and a peripheral outer side edge spaced from a peripheral inner side edge, said inner side edge defining an orifice, and adapted for insertion between a concrete riser exposed to mechanical vibrations and a metal component which transmits mechanical vibrations, comprising in weight %, 75 to 90% of rubber particles of varied size distribution in the range of 5 to 30 mesh, 5 to 12% of a polymer matrix, and 5 to 13% of reinforcing fibers, said rubber particles and reinforcing fibers being distributed throughout, and surrounded by, said matrix, said rubber particles being selected from rubber crumb, buffings from vehicle tires and mixtures thereof, and said molded article having a maximum Durometer Hardness variance of 20 Shore A, a tensile strength of at least 1 MPa, a Compression Deformation of 2 to 10% and a maximum Compression Set of 4%.

13. An article of claim 12, having a maximum Durometer Hardness variance of 15 Shore A.

14. An article of claim 12, having a Compression Deformation of 6%±2%.

15. An article according to claim 12, wherein said upper and lower surfaces are substantially parallel.

16. An article according to claim 12, wherein one of said major surfaces is inclined relative to the other such that the article tapers throughout its width.

17. An article according to claim 16, which is in a form of an annular disc.

18. An article according to claim 16, which is of rectangular outline.

19. In an assembly of a concrete risers and a metal component in which said metal component is exposed to vibration generating impacts, the vibrations being transmissible through said metal component to said concrete riser, the improvement wherein an adjustment unit or gasket is disposed between said metal component and said concrete riser to absorb mechanical vibrations transmitted through said metal component and inhibit transmission of the vibrations to the concrete riser, said adjustment unit or gasket being as defined in claim 12.

20. An article according to claim 1, wherein said reinforcing fibers comprise clumps of fiber matting in which fibers of the clumps are interlocked.

21. An article according to claim 3, wherein said reinforcing fibers comprise clumps of fiber matting in which fibers of the clumps are interlocked.

22. An article according to claim 8, wherein said reinforcing fibers comprise clumps of fiber matting in which fibers of the clumps are interlocked.

23. An article according to claim 8, wherein said reinforcing fibers comprise clumps of fiber matting in which fibers of the clumps are interlocked.

24. An article according to claim 7, wherein said fiber matting is nylon fibre matting and said rubber particles are buffings from vehicle tires, said buffings having a length significantly greater than width, and wherein interlocking occurs between adjacent buffings in the matrix.

25. An article according to claim 5, comprising, in weight %, about 80% of said rubber particles, about 8% of said polymer matrix and about 12% of said reinforcing fibres.

26. An article according to claim 24, comprising, in weight %, about 80% of said rubber particles, about 8% of said polymer matrix and about 12% of said reinforcing fibres.

27. An article according to claim 20, wherein said fibre matting is nylon fibre matting.

28. An article according to claim 21, wherein said fibre matting is nylon fibre matting.

29. An article according to claim 27, in which said polymer is a polyurethane.

30. An article according to claim 28, in which said polymer is a polyurethane.

31. An adjustment unit or gasket according to claim 8, wherein said reinforcing fibres comprise clumps of fiber matting in which fibres of the clumps are interlocked.

32. An adjustment unit or gasket according to claim 9, wherein said reinforcing fibres comprise clumps of fiber matting in which fibres of the clumps are interlocked.

33. An adjustment unit or gasket according to claim 8, wherein said rubber particles are buffings from vehicle tires, said buffings having a length significantly greater than width, and wherein interlocking occurs between adjacent buffings in the matrix.

34. An adjustment unit or gasket according to claim 33, wherein said reinforcing fibres comprise clumps of fibre matting in which fibres of the clumps are interlocked.

35. An adjustment unit or gasket according to claim 31, wherein said fibre matting is nylon fibre matting and said polymer is a polyurethane.

36. An assembly according to claim 10, wherein said rubber particles are buffings from vehicle tires, said buffings having a length significantly greater than width, and wherein interlocking occurs between adjacent buffings in the matrix.

37. An assembly according to claim 36, wherein said reinforcing fibres comprise clumps of fibre matting in which fibres of the clumps are interlocked.

38. An assembly according to claim 32, wherein said fibre matting is nylon fibre matting and said polymer is a polyurethane.

39. An article according to claim 12, wherein said rubber particles are buffings from vehicle tires, said buffings having a length significantly greater than width, and wherein interlocking occurs between adjacent buffings in the matrix.

40. An article according to claim 39, comprising, in weight %, about 80% of said rubber particles, about 8% of said polymer matrix and about 12% of said reinforcing fibres.

41. An article according to claim 39, wherein said reinforcing fibres comprise clumps of fibre matting in which fibres of the clumps are interlocked.

42. An article according to claim 41, wherein said fibre matting is nylon fibre matting and said polymer is a polyurethane.

43. An article according to claim 39 having a maximum Durometer Hardness variance of 15 Shore A.

44. An article according to claim 43, having a Compression Deformation of 6%±2%.

45. An adjustment unit or gasket according to claim 19, wherein said fibre matting is nylon fibre matting and said polymer is a polyurethane.

46. An assembly according to claim 45, wherein said rubber particles are buffings from vehicle tires, said buffings having a length significantly great than width, and wherein interlocking occurs between adjacent buffings in the matrix.

47. An assembly according to claim 46, wherein said reinforcing fibres comprise clumps of fibre matting in which fibres of the clamps are interlocked.

* * * * *